United States Patent [19]

Hashimoto

[11] Patent Number: 4,908,849

[45] Date of Patent: Mar. 13, 1990

[54] TELEPHONE ANSWERING DEVICE CAPABLE OF REPEATEDLY PLAYING BACK OUTGOING MESSAGE

[75] Inventor: Kazuo Hashimoto, Tokyo, Japan

[73] Assignee: Hashimoto Corporation, Tokyo, Japan

[21] Appl. No.: 278,952

[22] Filed: Nov. 30, 1988

[30] Foreign Application Priority Data

Dec. 1, 1987 [JP] Japan .................. 62-303805

[51] Int. Cl.$^4$ .................................... H04M 1/65
[52] U.S. Cl. ............................. 379/67; 379/72; 379/76; 379/77
[58] Field of Search ............ 379/88, 77, 76, 67, 379/72

[56] References Cited

U.S. PATENT DOCUMENTS

| | | | |
|---|---|---|---|
| 4,306,117 | 12/1981 | Jacobson | 379/76 |
| 4,654,485 | 3/1987 | Yamamoto | 379/73 |
| 4,700,376 | 10/1987 | Ohya et al. | 379/77 |

FOREIGN PATENT DOCUMENTS 2111350 6/1983 United Kingdom .
2145302 3/1985 United Kingdom .
2154098 8/1985 United Kingdom .

*Primary Examiner*—Thomas W. Brown
*Attorney, Agent, or Firm*—Lowe, Price, LeBlanc, Becker & Shur

[57] ABSTRACT

A telephone answering device wherein an outgoing messsage can be repeatedly played back from the beginning in response to a predetermined special signal sent out by a calling party. In case of a call to the device through a telephone operator, the calling party can listen to the whole outgoing message again by sending the special signal after the telephone operator puts him through. The calling party can then confirm that it is his desired called party's number. Further, if a foreign calling party is not able to understand thoroughly the outgoing message in the original language after only one playback, he can listen to the outgoing message again.

4 Claims, 3 Drawing Sheets

TELEPHONE ANSWERING DEVICE CAPABLE OF REPEATEDLY PLAYING BACK OUTGOING MESSAGE

TECHNICAL FIELD

The present invention relates to an automatic telephone answering device.

BACKGROUND ART

In a conventional automatic telephone answering device, when a calling party himself directly calls the device, he listens to an outgoing message transmitted from the telephone answering device and can confirm that it is his desired telephone number. However, if the calling party makes a call through a telephone operator, the telephone operator should understand by hearing whether the telephone answering device or a called party answers. It takes much time, so when the telephone operator connects the calling party to this number, the calling party himself can hardly listen to the outgoing message, or he can listen to only half the message.

Thus, when the telephone operator in an office or the like calls a desired telephone number at request of the calling party, and then the telephone answering device answers the operator, only one time playback of the outgoing message recorded in the telephone answering device cannot enable the calling party to confirm that it is his desired called party's telephone number, because he cannot listen to the whole outgoing message after the operator connects him to this number. The calling party therefore feels uneasy. Further, even when the calling party is, for example, a foreigner who cannot understand the original language very well and he wants to listen to the outgoing message in the original language once more again, he needs to hang up and dial over again.

DISCLOSURE OF THE INVENTION

It is an object of the present invention to provide a telephone answering device wherein when a telephone operator calls a desired called party's telephone number and connects a calling party to this number after knowing that the telephone answering device answers, and if the calling party cannot confirm from the outgoing message that it is his desired party because a dozen seconds have elapsed, he can listen to the outgoing message from the beginning again by sending out a predetermined special signal.

The above and other objects, features and advantages of the present invention will become more apparent from the following description when taken in conjunction with the accompanying drawings in which preferred embodiments of the present invention are shown by way of illustrative example.

BEST MODE FOR CARRYING OUT THE INVENTION

The arrangement and operation in the preferred embodiment of the present invention will now be described as follows.

Figure 1:
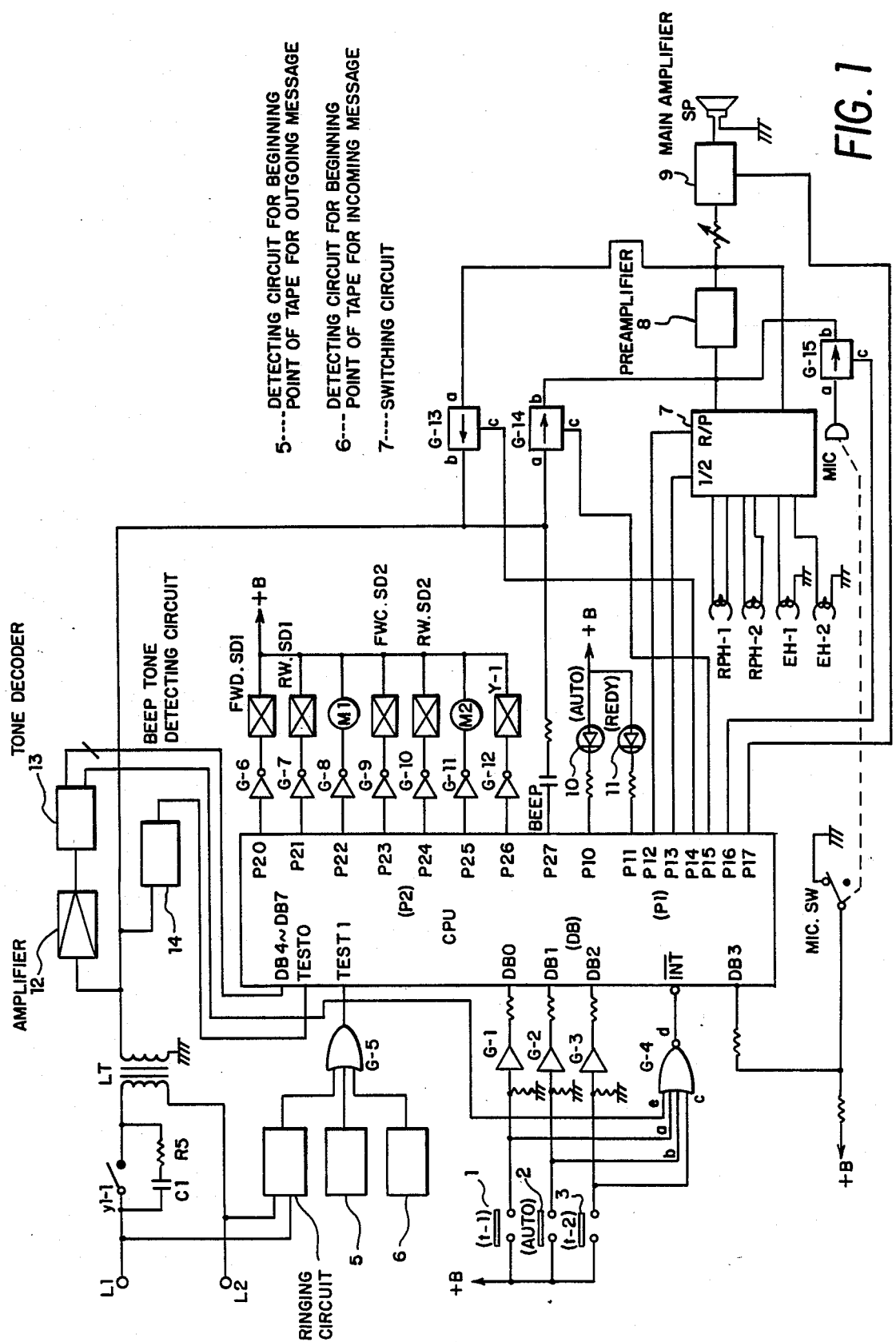
FIG. 1 is a block view of a preferred embodiment of the invention.

In FIG. 1, numeral 1 denotes an operation key for an outgoing message tape (not shown in the drawings). Numeral 2 denotes an operation key for setting this device to an automatic outgoing message recording mode. Numeral 3 denotes an operation key for an incoming message (not shown in the drawings). A detailed explanation of the operation keys is omitted, because the explanation of the operation has already been given in detail in Japanese laid open publication No. 61-70841, filed in Japan by the same applicant, and which does not relate directly to this invention. The operation keys carry out an interrupt of the CPU through an NOR gate connected to the input terminals DB0-DB2 of the CPU in a one chip microcomputer through the buffers G-1, G-2, and G-3.

Symbols L1 and L2 denote telephone lines. Numeral 4 denotes a ringing circuit for detecting a calling signal and an ON-hook condition of the calling party. Numeral 5 denotes a detecting circuit for the beginning point of the outgoing message tape. Numeral 6 denotes a detecting circuit for the beginning point of the incoming message tape. Numeral 7 denotes a switching circuit for switching among a recording playback head RPH-1, an outgoing message erasing head EH-1 and a recording playback head RPH-1, and an incoming message tape erasing head EH-2, and for switching to recording and playback modes.

Numeral 8 denotes a preamplifier. Numeral 9 denotes an amplifier for amplifying a remote control signal (PB tone). Numeral 13 denotes a tone decoder for decoding the remote control signal to the binary number system. Numeral 14 denotes a beep tone detecting circuit. Symbols G-6-G-12 denote drivers. Symbol M1 denotes a motor for driving the outgoing message tape. Symbol FWD.SD1 denotes a solenoid for driving the outgoing message tape at a normal speed. Symbol RW.SD1 denotes a solenoid for rewinding the outgoing message tape. Symbol M2 denotes a motor for driving the incoming message tape. Symbol FWD.SD2 denotes a solenoid for driving the incoming message tape at the normal speed. Symbol RW.SD2 denotes a solenoid for rewinding the incoming message tape. Symbols G-13-G-15 denote analog switches.

Figure 2:
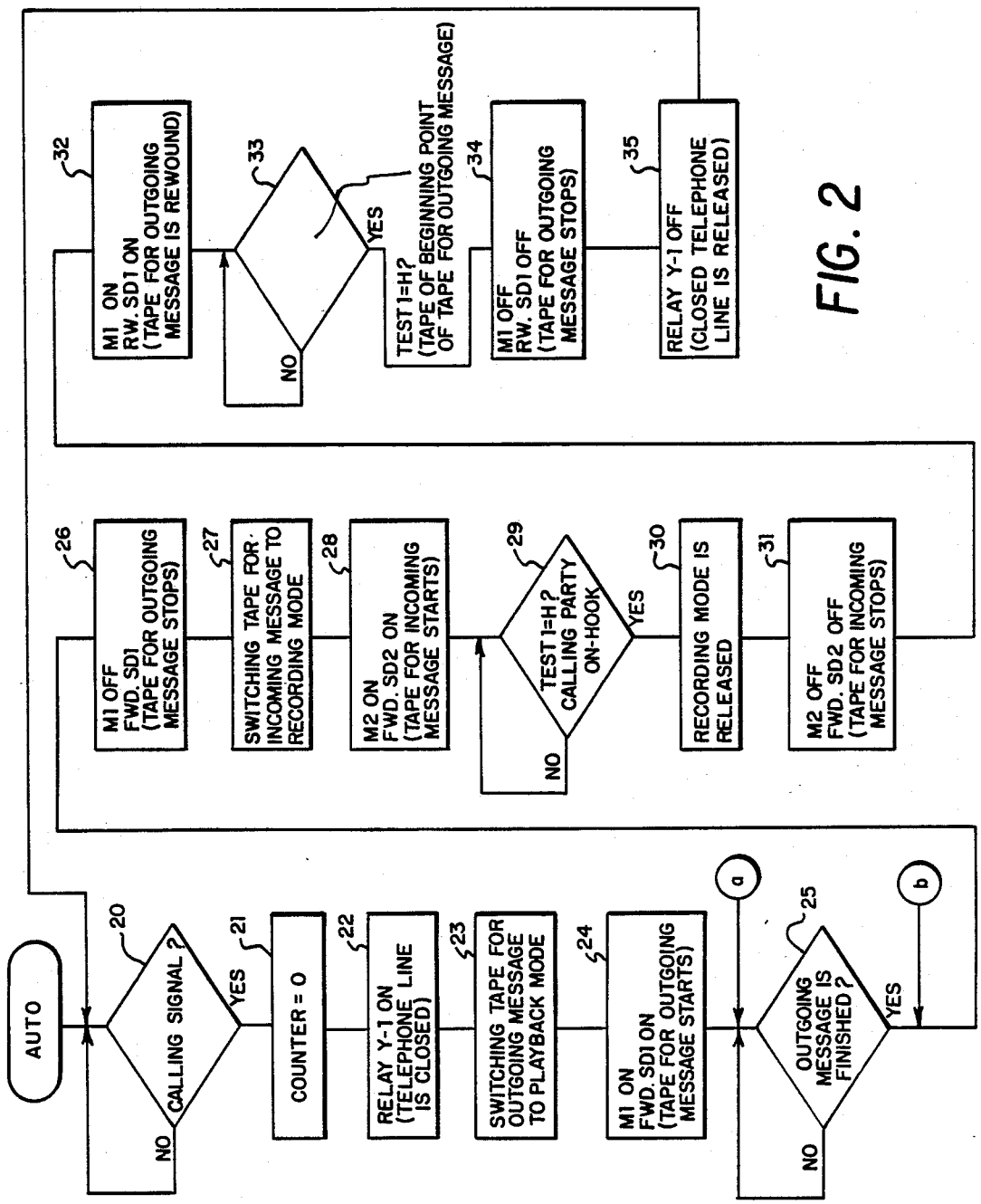
FIG. 2 is a flow chart of an automatic answering recording operation of the preferred embodiment of the invention.
Figure 3:
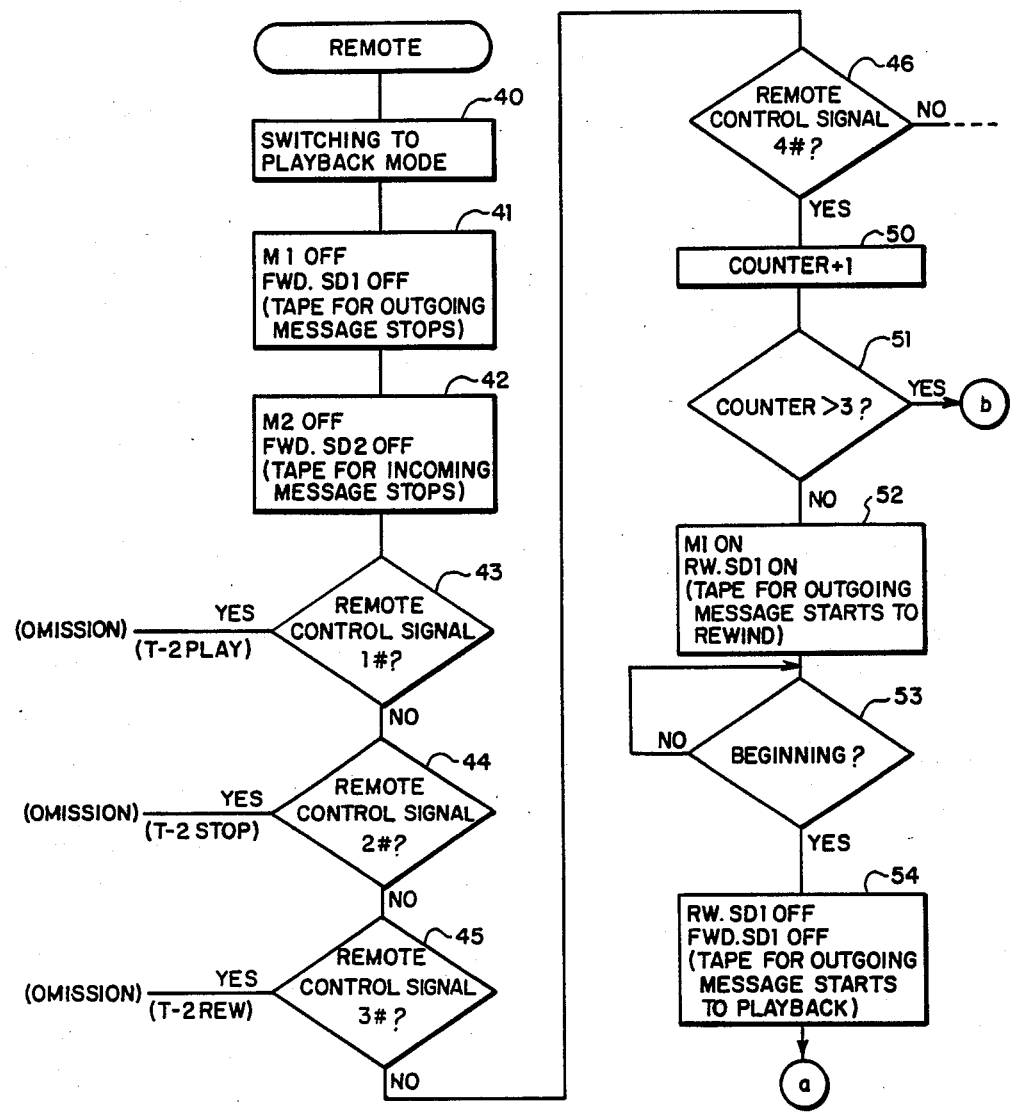
FIG. 3 is a flow chart which shows a CPU interrupt operation controlled by a remote control signal in accordance with the preferred embodiment of the invention.

The operation of this invention will now be described in detail in accordance with the flow charts of FIG. 2 and FIG. 3. The flow chart of FIG. 2 shows the operation of the automatic answering recording mode set by turning ON of the key for operation 2 (AUTO) in FIG. 1. The outgoing message and the beep tone after the outgoing message have already been recorded on the outgoing message tape (not shown in the drawings), as shown in the specification of the Japanese laid open publication No. 61-70841.

Step 20 in FIG. 2 designates the waiting condition for waiting for an incoming calling signal. In FIG. 1, when the calling signal is input to terminals L1 and L2, and the program detects the calling signal through the ringing circuit 4, the OR gate G-5, and the input terminal of the CPU, the program is affirmed in step 20, and the program advances to step 21.

After the counter for playback of the outgoing message tape is set to the initial "0" in step 22, the output port P26 of the CPU is set to the H level. The relay Y-1 for closing is set to ON through the driver G-12. The telephone line is closed by contacts y1-1. As a result, the calling signal stops, and the condition for talking over the telephone is set.

In step 23, when the input terminal R/P of the switching circuit 7 is set to the L level, and the input terminal 1/2 is set to the H level, the recording playback head RPH-1 is connected to the preamplifier 8 and is set to the playback mode. In step 24, the motor M1 and the solenoid FWD.SD1 are set to ON, the outgoing message tape is driven at the normal speed from the beginning point. As a result, the outgoing message is sent to the telephone line through the recording playback head RPH-1, the switching circuit, the preamplifier, the driver G-13, and the line transformer L.

When the outgoing message has finished being sent and the beep tone which has already been recorded after the outgoing message is detected by the beep tone detecting circuit 14 (step 25), the program sets the motor M1 and the solenoid FWD.SD1 to OFF, and stops the outgoing message tape in this position (step 26). The program then switches the switching circuit 7, the analog switch G-13 and G-14 to the recording mode for the incoming message tape (step 27), and sets the motor M2 and the solenoid FWD.SD2 to ON (step 28). As a result, the incoming message tape starts in the recording mode. Accordingly, the message from the calling party is input to the recording playback head RPH-2 through the line transformer L, the analog switch G-14, the preamplifier 8 and the switching circuit 7. As a result, the message is recorded on the incoming message tape.

The calling party sets the telephone set to ON-hook after the message is recorded, and the ringing circuit 4 detects a voltage variation in the telephone line at this time. The ringing circuit 4 outputs the pulse of a H level, which is detected by the program in the CPU through the OR gate G-5, TEST 1 (step 29). As a result, the recording mode is released (step 30), the motor M2 and the solenoid FWD.SD2 are set to OFF, and the incoming message tape is stopped (step 31). Next, the motor M1 and the solenoid RW.DSI are set to ON, and the outgoing message tape which stops at the position of the beep tone as above starts to be rewound (step 32).

The beginning point of the outgoing message tape is detected through the outgoing message tape beginning point detecting circuit and the input terminal TEST 1 (step 33). Driving of the outgoing message tape stops (step 34). Closing of the telephone line is released by setting the relay Y-1 to OFF (step 35). This device is restored to the waiting condition of step 20.

Playback of the outgoing message from the outgoing message tape by remote control operation, which is an objective of this invention, will be now described with reference to FIG. 3. For example, when the calling party calls from Japan to U.S.A. through a telephone operator, but the called party is absent, and the telephone operator says to the calling party that the telephone answering device is operated, playback of the outgoing message has already been finished, and the device is switched to the recording mode in many cases. Accordingly, there is no means for confirming the called party, and the calling party is eager to record the message in the telephone answering device. In this invention, the remote control signal, PB tone of "4#", for example, which is preset, is sent from the tone type telephone set. The first code portion "4" is decoded from the PB tone to the binary number system (4 bits) by the tone decoder 13 through the line transformer L and the amplifier 12. This code is input to the input terminal DB 4–DB 7 of the CPU, and a strobe signal is input to the interrupting terminal INT of the CPU through the terminals e, d of the NOR gate G-4 at the same time. The program interrupts the CPU, and jumps from the flow chart of FIG. 1 to the flow chart for CPU interrupt shown in FIG. 3.

In step 40, the program switches the switching circuit 7, the analog switch G-13, and G-14 to the playback mode. The operation of step 40 is to prevent erasing the outgoing message by unintentional rewinding of the outgoing message tape in the recording mode, and for prevention of mis-operation, i.e., ensuring that the outgoing message tape is played back again in accordance with playback of the "4#" in playback operation by remote control of the owner because the entire code "4#" in PB tone is recorded on the incoming message tape.

In step 41, if the outgoing message tape is being driven when the calling party operates the remote control, the program stops driving the outgoing message tape. When the incoming message tape is being driven, the program stops driving of the incoming message tape (step 42). The remote control signal "4" of the first code portion described above is stored in a register (not shown in the drawings; this part of the flow chart is omitted). When the remote control signal "#" of the second code portion is sent, it is tested whether the predetermined remote control signal coincides with the remote control signal which is sent in steps 43, 44, 45, 46...(the rest is omitted).

In step 46, when a remote control signal of two figures coincides with a preset remote control signal, the program advances to step 50, and the counter set to the initial condition in the step 21 counts 1 (1 byte of the memory set in the CPU is used). In step 51, it is tested whether the counter counts 2 or more. Accordingly, when the remote control signal "4#" is sent less than twice, namely, the outgoing message tape is played back again up to three times, this step is negative, the program shifts to step 52, and can play back the outgoing message normally again as described as follows.

In step 52, the program sets the motor M1 and the solenoid RW.SD1 to ON, and starts to rewind the outgoing message tape. When the outgoing message tape is rewound to the beginning (step 53), the solenoid RW.SD1 is set to OFF, and the solenoid FWD.SD1 is set to ON (step 54). As a result, the outgoing message is played back from the beginning and is output to the calling party. The calling party can confirm whether the called party is truly who the calling party wants to call. After that, the program returns to step 25 in FIG. 2 through symbol a.

This device is switched to the recording condition as above, and is restored to a waiting condition after recording the message from the calling party. On the other hand, when the third party tries to playback the outgoing message tape more than four times for the purpose of mischief, step 51 is affirmative. Accordingly, the program does not playback the outgoing message tape again, switches the device to the recording mode for the message from the calling party through the symbol b and step 26, and a voice from the calling party is recorded on the incoming message tape.

In the above operation, the remote control signal "4#" is output at once, and it is possible to output the remote control signal "4#" after outputting a specific signal, as is well known.

Everybody can use the code of the remote control signal which plays back the outgoing message again, if the code of the remote control signal is generally known. It is possible to set the code of other remote control signals, the remote control signal which controls the incoming message tape, for example, to operate after the specific signal is output, as is well known.

The outgoing message tape can be made of solid state memory. If the outgoing message tape is made of a solid state memory, it is not necessary to rewind the tape, and it is possible to access the outgoing message speedily.

This device is useful not only to a telephone answering device, but also to a device which carries out an automatically respondent service in accordance with a receiving signal, and also to a device which carries out conversation using a computer, for example, when the operator hopes to hear the outgoing message again for confirmation of the outgoing message.

As described above, in this invention, when the calling party calls the telephone answering device of the called party through the telephone operator, even if the telephone operator connects the called party, and the calling party cannot confirm the called party, the outgoing message of the telephone answering device of this invention can be output from the beginning point of the outgoing message tape by sending a preset specific signal from the calling party. As a result, the calling party can confirm whether the called party is truly who the calling party wants to call. A foreigner who cannot understand completely the outgoing message can hear the outgoing message repeatedly by using this device. Accordingly, it is possible to use sufficiently the telephone answering device by using this device of the invention. This device of the invention therefore can increase the usefulness of the telephone answering device.

In this disclosure, there is shown and described only the preferred embodiment of the invention, but as aforementioned, it is to be understood that the invention is capable of use in various other combinations and environments and is capable of changes or modifications within the scope of the inventive concept as expressed herein.

I claim:

1. A telephone answering device for automatically answering an incoming call and recording an incoming message from a calling party, which device is capable of repeatedly playing back an outgoing message, comprising;
    a recording medium for recording the outgoing message;
    a recording medium for recording or storing the incoming message;
    means for forming a loop circuit in response to the incoming call, recording the incoming message from the calling party on the incoming message recording medium after said outgoing message is transmitted, and thereafter returning the device to a standby mode;
    means for playing back again the same outgoing message from the beginning in response to a special signal sent out by the calling party when he wants to listen to the outgoing message again; and
    means for driving the incoming message recording medium and recording the incoming message from the calling party on the incoming message recording medium after said outgoing message is played back once more again from the beginning, and thereafter returning the device to the standby mode.

2. The device of claim 1, including means for storing a predetermined signal code and means for comparing said special signal sent out by the calling party with said predetermined signal code for controlling said playing back means.

3. The device of claim 1 including counter means for counting the number of times that the outgoing message is played back again, and means for preventing additional playing back of the outgoing message if the number of times counted by said counter means is greater than a predetermined number.

4. The device of claim 1, including detector means for detecting starting points of said incoming message recording medium and said outgoing message recording medium, said playing back means and said driving means being responsive to an output of said detector means.

* * * * *